US008284649B1

(12) United States Patent
Faucher et al.

(10) Patent No.: US 8,284,649 B1
(45) Date of Patent: Oct. 9, 2012

(54) CONTROLLED CHATTER PATTERNING FOR WRITING/DATA STORAGE AT THE NANOMETER SCALE

(75) Inventors: Santiago Faucher, Oakville (CA); Paul Gerroir, Oakville (CA); Gordon Sisler, St. Catharines (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/167,071

(22) Filed: Jun. 23, 2011

(51) Int. Cl.
*G11B 7/00* (2006.01)

(52) U.S. Cl. ........................................ 369/100
(58) Field of Classification Search ............... 369/100, 369/44.12, 134, 85, 126, 47.1, 52.1, 47.2, 369/47.19
See application file for complete search history.

(56) References Cited

U.S. PATENT DOCUMENTS 6,476,381 B1 * 11/2002 Jhe et al. ................... 250/234

* cited by examiner

*Primary Examiner* — Nabil Hindi
(74) *Attorney, Agent, or Firm* — MH2 Technology Law Group LLP

(57) ABSTRACT

In accordance with aspects of the present disclosure, a method, product, apparatus and system is disclosed. In some aspects of the present disclosure, a method of writing data to a data storage device is described that includes acquiring data from a data source; encoding the data in a format for writing; and embedding the encoded data into one or more periodic structures formed by controlled chatter patterning onto a substrate of the data storage device.

23 Claims, 5 Drawing Sheets v=4 mm/s, h=40 khz, A=29.9V v=8 mm/s, h=25 khz, A=29.9V v=16 mm/s, h=25 khz, A=29.9V v=30 mm/s, h=25 khz, A=29.9V

CONTROLLED CHATTER PATTERNING FOR WRITING/DATA STORAGE AT THE NANOMETER SCALE

FIELD OF THE DISCLOSURE

The present application is directed to a data storage medium, and more particularly to a method, apparatus and system of controlled chatter patterning for writing/data storage at the nanometer scale.

BACKGROUND OF THE DISCLOSURE

Data storage is accomplished through various means in our society. Printed texts have been in existence for some time but suffer from fading and deterioration because of the underlying material on which the print is applied. In a similar manner, electronic data storage is also finite because the technologies utilized are usually reversible to allow read-write capabilities. For example, magnetic tapes are believed to have a lifespan of 10 to 30 years. Compact disc ("CD") technology also suffers from material degradation as it utilizes a dye to store the data and this dye is prone to degradation. Estimates of the lifespan of CDs are typically between two to five years, depending on the quality of the CD. In contrast, vinyl records are known to have longer lifespans, in the order of 100 years. This increased performance is a direct result of data being physically grooved into the material to form ridges and the integrity of these ridges with time based on the slow deformation (flow) of vinyl with time. These ridges when turned against a needle cause vibrations to be converted into electrical signals and later sound. Unfortunately, however, the density of data that can be stored on such devices is limited because of the physical size of the grooves. A 12 inch vinyl record holds up to 45 minutes of music which corresponds to approximately 40 MB of memory. The memory density (or actually memory area) of this format is therefore in the order of 4 Mbits/in$^2$. Table 1 summarizes this calculation.

TABLE 1

| Calculation of Memory Density for 12" LP | |
|---|---|
| Area of Record | 113.1 in$^2$ |
| Area Non-Playable | 28.3 in$^2$ |
| Area Playable | 84.8 in$^2$ |
| Data Stored | 40 Mbytes |
| | 320 Mbits |
| Memory Density | 3772562 Bits/in$^2$ |
| | 3.77 Mbits/in$^2$ |

In contrast, the compact disc has a memory density in the order of 900 Mbits/in$^2$, but does not have the memory longevity of the vinyl LP record. While hard drives have substantially higher memory densities, in the order of 150 Gbits/in$^2$, these magnetic media similarly have limited longevities in the order of 5 to 30 years.

Conventionally, photolithography and e-beam lithography have been used to fabricate periodic ordered structures having nano- to micrometer feature sizes. Although these techniques are versatile in terms of complicated structures, these methods are limited by their high capital costs, selectivity of material types and inability to pattern curved and nonplanar surfaces.

A method of recording digital data in high density that retains data for a long period of time (>100 years) would therefore be highly desirable.

SUMMARY OF THE DISCLOSURE

In accordance with some aspects of the present disclosure, a method of writing data to a data storage device is described that includes acquiring data from a data source; encoding the data in a format for writing; and embedding the encoded data into one or more periodic structures formed by controlled chatter patterning onto a substrate of the data storage device.

In accordance with some aspects of the present disclosure, a method of reading data from a data storage device is described that includes Imaging one or more periodic structures formed on a substrate of the data storage device by controlled chatter patterning; and converting the one or more periodic structures into user recognizable data using a predetermining coding algorithm.

In accordance with some aspects of the present disclosure, a device for writing data to a data storage device is described that includes a data acquisition module configured to acquire data to be written to the data storage device from a data source; an encoder configured to encode the data in a format for writing; and an embedder configured to embed the encoded data into one or more periodic structures formed by controlled chatter patterning onto a substrate of the data storage device.

In accordance with some aspects of the present disclosure, a data storage device is described that includes a substrate including a one or more periodic structures formed thereon by controlled chatter patterning, wherein the one or more periodic structures are encoded to represent data stored thereon.

In accordance with some aspects of the present disclosure, a device for reading data from a data storage device is described that includes an Imaging module configured to image one or more periodic structures formed on a substrate of the data storage device by controlled chatter patterning; and a conversion module configured to convert the one or more periodic structures into user recognizable data using a predetermining coding algorithm.

In accordance with aspects of the disclosure, a method is disclosed. The method can include forming a first set of periodic structures on a first region of a surface of a substrate using controlled chatter patterning, wherein the first set of periodic structures represents a first set of information stored on the first region; and forming a second set of periodic structures on a second region of the surface using controlled chatter patterning, wherein the second set of periodic structures represents a second set of information stored on the second region.

The method can further include reading the first and the second regions by a reading device. The method also can include processing the read regions to convert the first and the second stored information to another form.

In accordance with some aspects of the disclosure, the substrate may be a polymer material or a metal material. The metal material can include materials, for example, gold, silver, copper, zinc, nickel, aluminum, tin, palladium, platinum and various combinations and alloys of these metal materials. The polymer material can include materials, for example, polyacrylates, polystyrenes, polyesters, polycarbonates, polyolefins, polyurethanes and various epoxies and combinations of these polymer materials.

In accordance with some aspects of the disclosure, the first and the second set of periodic structures can be of a scale between nanometers and micrometers and can be arranged to store digital or analog data. The first and the second set of periodic structures can have the form of a series of peaks and troughs that are formed into the substrate and can differ in structures or form in at least one parameter. The at least one parameter can include, for example, a spacing between an adjacent peak or trough, a wavelength of the periodic structures, an amplitude of the periodic structures and various combinations of these parameters.

In accordance with some aspects of the disclosure, the controlled chatter patterning can include selectively applying a cutting tool to the substrate using a controller, where the controller can be arranged to control various aspects related to the operation of the cutting tool, for example, and a speed at which the cutting tool is applied to the substrate. The cutting tool or at least a portion of the cutting tool, for example, a cutting edge can includes a material or materials made from, for example, tungsten carbide, hardened steel, steel, brass, quartz, topaz, corundum, diamond and various alloys and combination of these materials. In general, the cutting tool or cutting, edge of the tool can be of a suitable material that is harder than the substrate that is being cut.

In accordance with some aspects of the disclosure, a product can be made or formed by the above-described method. Products can include storage devices or storage medium that can store digital or analog data that can later be read by a suitable reading device.

In accordance with some aspects of the disclosure, an apparatus is disclosed. The apparatus can include a machine-readable storage medium including a substrate; a first set of periodic structures formed on a first region of a surface of the substrate using controlled chatter patterning, wherein the first set of periodic structures represents a first set of information stored on the first region; and a second set of periodic structures formed on a second region of the surface using controlled chatter patterning, wherein the second set of periodic structures represents a second set of information stored on the second region.

In accordance with some aspects of the disclosure, a system is disclosed. The system can include a machine-readable storage medium including a substrate; a first set of periodic structures formed on a first region of a surface of the substrate using controlled chatter patterning, wherein the first set of periodic structures represents a first set of information stored on the first region; and a second set of periodic structures formed on a second region of the surface using controlled chatter patterning, wherein the second set of periodic structures represents a second set of information stored on the second region; and a reading device arranged to read the first and the second set of information stored in the first and the second region, respectively.

In accordance with some aspects of the disclosure, the vibrational frequency can be controlled with which the cutting tool is oscillated. Additionally or alternatively, the speed at which the cutting tool is applied to across a surface of the substrate or the speed at which the substrate is moved with respect to the cutting tool can also be controlled.

Aspects of the present disclosure are described, merely for the sake of illustration, as including a first and a second set of periodic structures; however, the various aspects should not be read to be limited to only a first and a second set. Multiple sets of periodic structures can be formed into the substrate using the principles described in the present application. These multiple sets of periodic structures can be used to store analog or digital data as described herein.

Additional embodiments and advantages of the disclosure will be set forth in part in the description which follows, and can be learned by practice of the disclosure. The embodiments and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments of the disclosure and, together with the description, serve to explain the principles of the disclosure.

DESCRIPTION OF THE EMBODIMENTS

Reference will now be made in detail to various exemplary embodiments of the present application, examples of which are illustrated in the accompanying drawings. Wherever possible, the same reference numbers will be used throughout the drawings to refer to the same or like parts.

In accordance with aspects of the present disclosure, an application of controlled chatter patterning is presented to create nano- and micro-patterns onto a substrate to produce a data storage medium. The substrate can be made of various materials, for example, polymeric or metallic materials. As used herein, the phrase "controlled chatter patterning" will mean the controlled formation of patterns less than about 1 µm onto a substrate by application of a cutting tool that is subjected to a vibrational frequency. In some aspects, the vibrational frequency can be in the ultrasonic range, for example, between 20 kHz and 60 kHz. In some aspects of the present disclosure, the vibrational frequency range at which the cutting tool is controlled can be between 25 kHz and 45 kHz. The formed patterns created are akin to a series of ridges, but are in the nanometer size range.

The cutting tool can be controlled in a variety of manners by a controller. For example, the cutting tool can either be increased or decreased in speed at which the tool cuts into the substrate. By increasing the speed of cut, the wavelength of the pattern formed onto the substrate can be increased. Similarly by decreasing the speed of cut, the wavelength can be decreased. By reducing the frequency of the ultrasound waves driving the cutting tool, the wavelength of the pattern can be increased. Similarly by increasing the frequency of the ultrasonic waves, the wavelength of the pattern can be decreased. The amplitude of the cut can also be changed moderately as a function of the cutting speed. A slower cutting speed will lead to a wave with lower amplitude. In contrast, a higher cutting speed will give a wave with larger amplitude.

The patterns created resemble wave (grooves) on a record but occur on a length scale of nanometers. These patterns can be coded to correspond to our natural language in a manner akin to the binary system currently used today in computer systems. This code can be written and later read. This approach to data storage provides both high memory density, in the order of 2 Tbits/in² (an order of magnitude higher than the current commercial technology), and high data longevity (>100 years).

Figure 1:
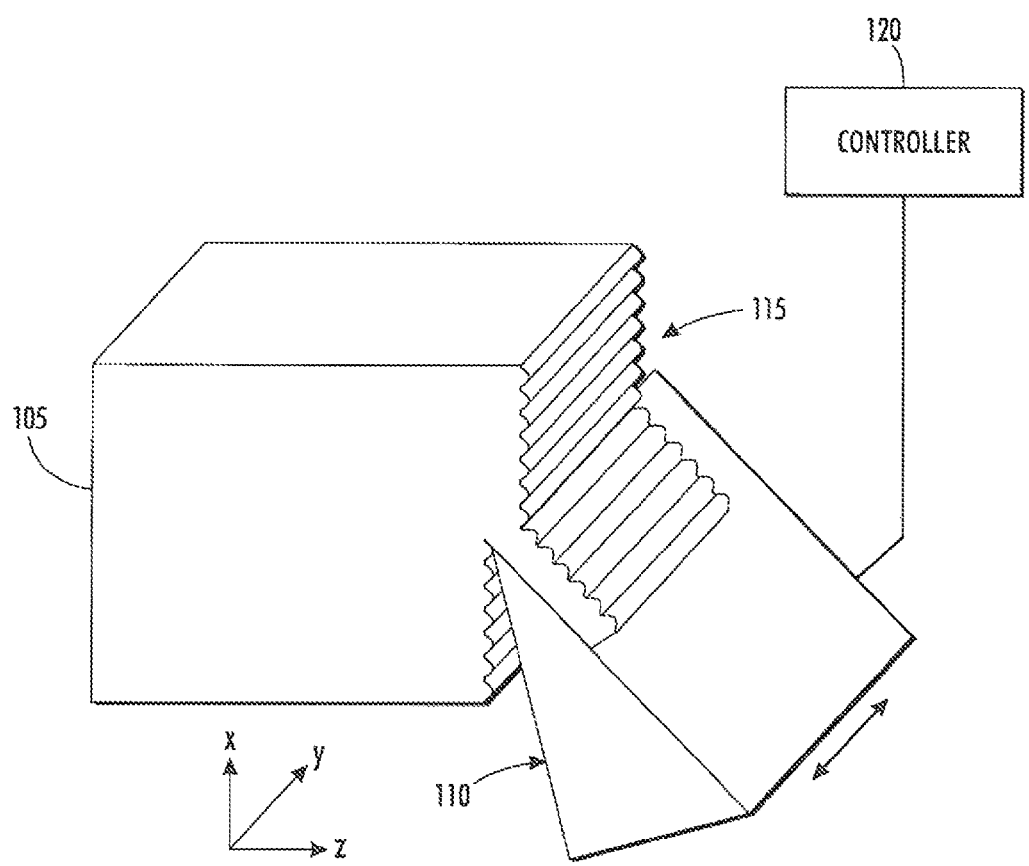
FIG. 1 shows an example schematic of a cutting process using microtome sectioning in accordance with aspects of the present disclosure.

FIG. 1 shows an example schematic device for producing the storage medium using the controlled chattering method. Substrate 105 is arranged to move down in the −x direction, while cutting tool 110 is arranged to oscillate in the y direction. The cutting depth is depicted in the z direction. Cutting tool 110 can include cutting edge 115 that is used to form repeating patterns into the substrate. As shown, cutting tool 110 is arranged as a microtome; however, this is merely an example arrangement of cutting tool 110. Other suitable arrangement of controlling cutting tool 110 can be used to form the repeated patterns on substrate 105. Cutting tool can be controlled by an actuator or controller 120 to adjust the various cutting modes discussed above.

Substrate 105 can be composed of various materials, for example, a polymer material or a metal material. The metal material can include materials, for example, gold, silver, copper, zinc, nickel, aluminum, tin, palladium, platinum and various combinations and alloys of these metal materials. The polymer material can include materials, for example, polyacrylates, polystyrenes, polyesters, polycarbonates, polyolefins, polyurethanes and various epoxies and combinations of these polymer materials.

Cutting tool 110 or cutting edge 115 can be made of a suitable material that is harder than substrate 105 that is being cut. Examples of suitable materials include but are not limited to tungsten carbide, hardened steel, steel, brass, quartz, topaz, corundum, diamond and various alloys and combination of these materials.

Cutting tool 110 or cutting edge 115 can be actuated or controlled by one or more controllers, for example a piezoelectric transducer, to cause cutting tool 110 to oscillate or chatter as it skives across substrate 105 in a controlled manner. The controller can be driven at an ultrasonic frequency, for example between 25 and 45 kHz, and at cutting speeds between 2 and 50 mm/s.

By adjusting the operation of cutting tool 110 by the controller, repeatable patterns can be formed into substrate 105. For example, a first set of repeating or periodic patterns can be formed into substrate 105 by controlling one or more operating parameters of cutting tool 110. These one or more parameters can be changed by the controller to form a second set of repeating or periodic patterns into substrate 105. As this process is repeated, a first set of periodic patterns and a second set of periodic patterns can be alternatively formed into substrate 105. These periodic patterns can be used to encode a variety type of data, for example digital or analog data can be encoded by repeating patterning of these structures onto substrate 105.

Figure 2:
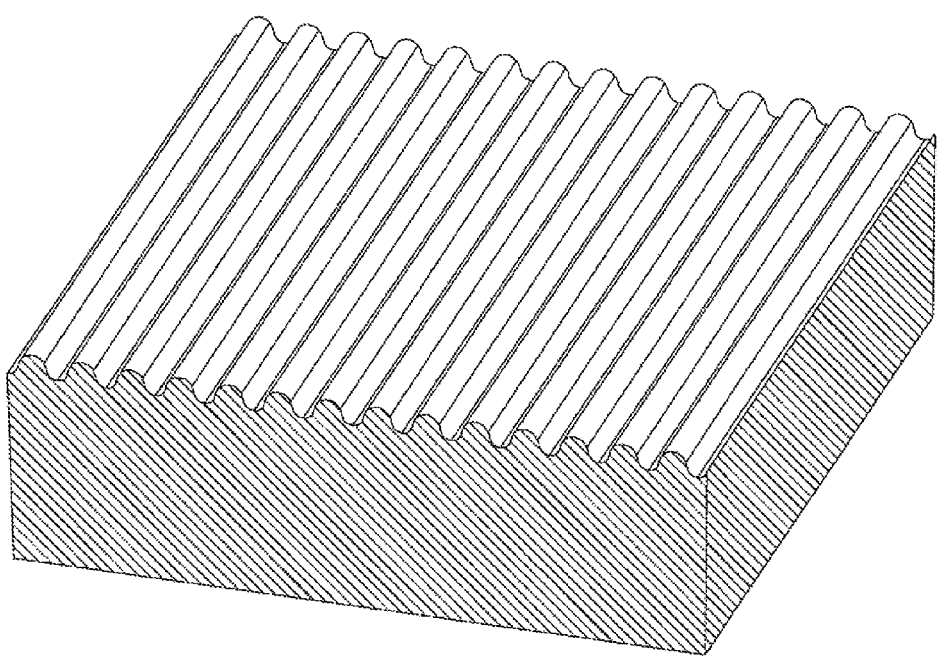
FIG. 2 shows an example pattern following controlled chattered cutting having a pattern formed onto a polycarbonate substrate in accordance with aspects of the present disclosure.

FIG. 2 shows an example patterns following controlled chattered cutting formed onto a polycarbonate substrate. In this example, the pattern has period of 210 nm. The polycarbonate can be cut on a microtome at a cutting speed of 10 mm/sec, feed rate of 80 nm and the ultrasonic knife set at 29.9 V and 25.0 kHz. A repeating pattern has a peak to peak distance (period) of 210 nm.

Figure 3A:
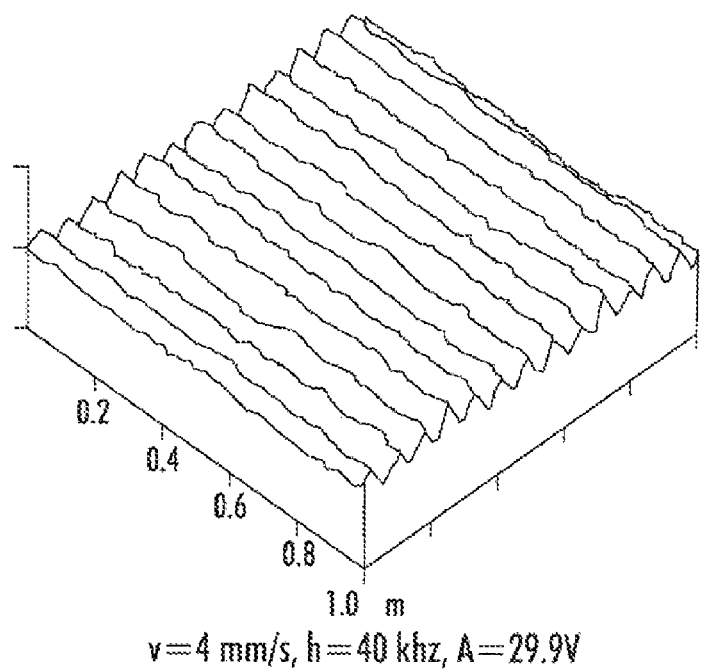
FIGS. 3A-3D show example patterns following controlled chattered cutting with different cutting parameters in accordance with aspects of the present disclosure.
Figure 3B:
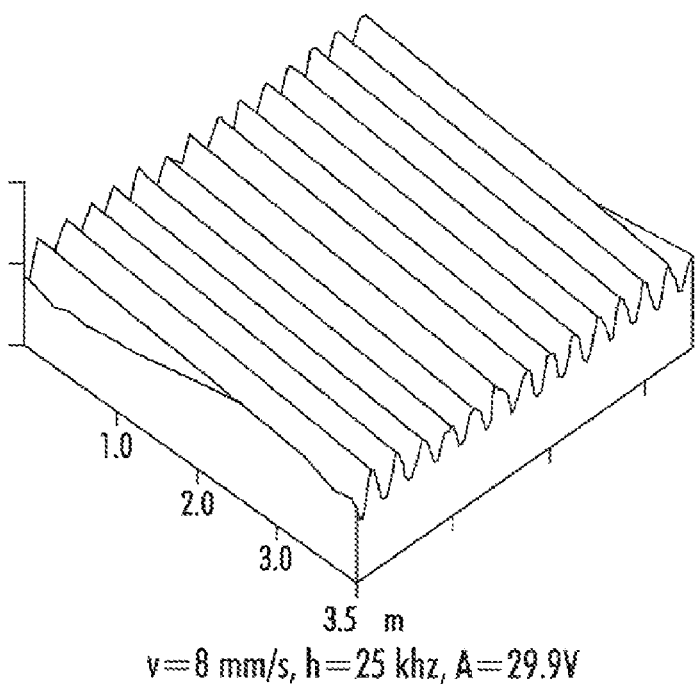
Figure 3C:
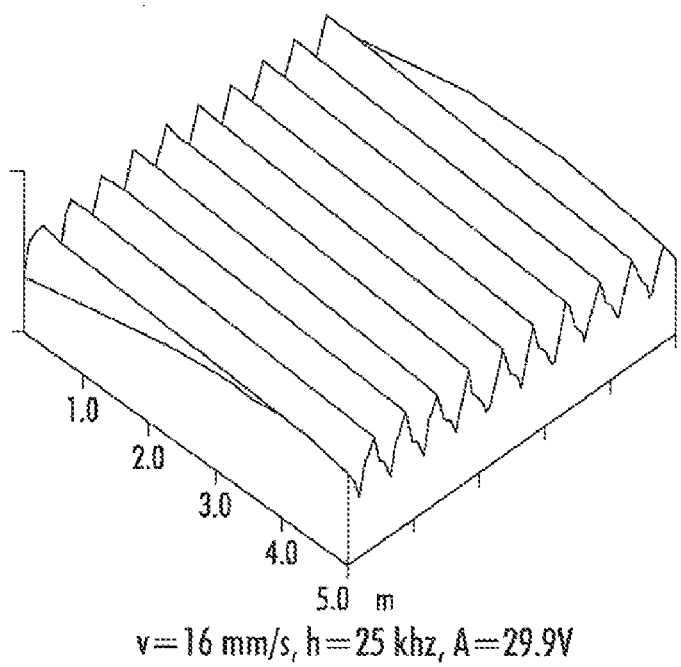
Figure 3D:
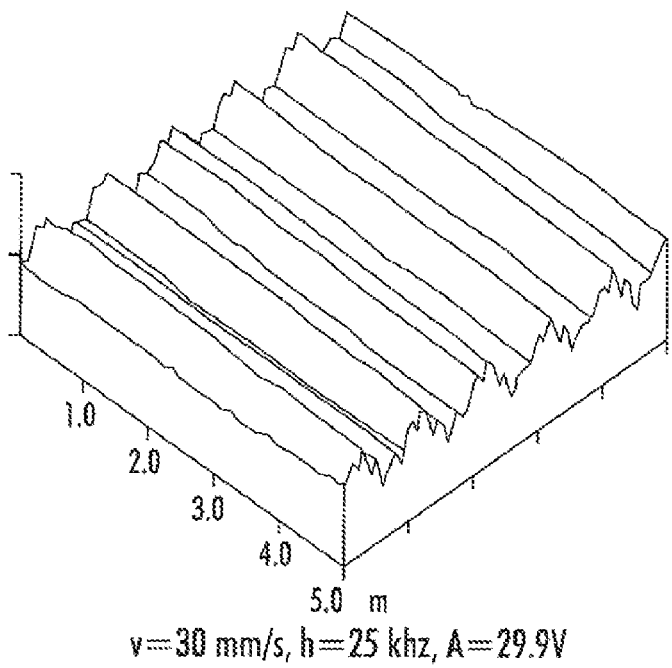

FIGS. 3A-3D show example patterns following controlled chattering with different cutting parameters. FIG. 3A shows patterns formed using a cutting speed of 4 mm/s, a frequency of 40 kHz and a voltage of 29.9 V. FIG. 3B shows patterns formed using a cutting speed of 8 mm/s, a frequency of 25 kHz and a voltage of 29.9 V. FIG. 3C shows patterns formed using a cutting speed of 16 mm/s, a frequency of 25 kHz and a voltage of 29.9 V. FIG. 3D shows patterns formed using a cutting speed of 30 mm/s, a frequency of 25 kHz and a voltage of 29.9 V. The above speeds, frequencies and voltages at which the cutting tool are operated are merely exemplary, other suitable parameters can also be used so long as repeatable patterns are formed into the substrate that can be used to encode data and be read by a suitable reader.

Figure 4:
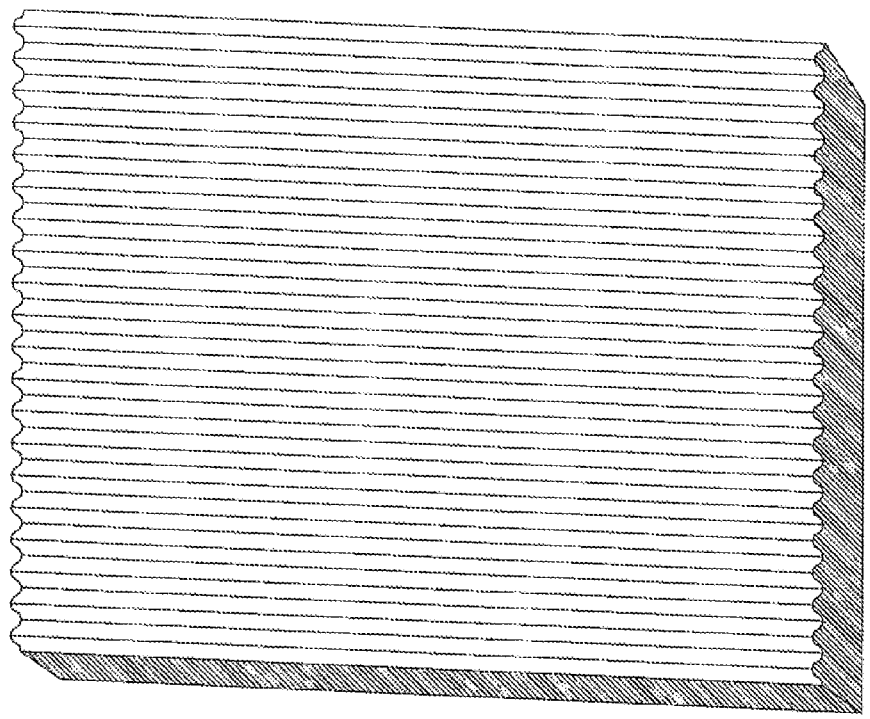
FIG. 4 shows an example polycarbonate substrate with a pattern formed thereon with period of 125 nm in accordance with aspects of the present disclosure.

FIG. 4 shows an example polycarbonate substrate with a pattern formed thereon with period of 125 nm. The polycarbonate can be cut on a microtome at, for example, a cutting speed of 6 mm/sec, feed rate of 80 nm and the ultrasonic knife set at 29.9 V and 25.0 kHz, which results in a peak distance (period) of 125 nm.

Since the above cutting process can be controlled to afford a specific pattern and given that this pattern can be changed dynamically during the same cut and given that one can read the pattern cut onto the surface by such techniques as transmission electron microscopy (TEM), atomic force microscopy (AFM), surface profiles and diffraction techniques, the patterned substrate can be used to record information. A suitable reading device, for example, using TEM or AFM technology or other technology that can read the patterns formed onto the substrate, can be to read the encoded data and convert it back to recognizable characters or other information.

Table 2 summarizes the calculation utilized to estimate the information density expected from the present invention. For the purpose of the calculation, the data stored in the King James Christian Bible has been used for demonstration. It is assumed that a character can be recorded in an area that is less than 2500 nm² using controlled chatter patterning. Based on this reasonable assumption the memory density of the present disclosure is estimated to be in the order of 2 Tbits/in². The entire contents of the bible could be recorded in an area of 0.012 mm².

TABLE 2

Calculation of Memory Density in Accordance with Aspects of Present Disclosure

| | |
|---|---|
| Number of words in the bible | 788258 |
| Number of characters in the bible | 4000000 |
| Number of spaces in the bible | 788258 |
| Number of letters in the bible | 4000000 |
| Total number of characters | 4788258 |
| Area per letter | 2500 nm² |
| Total area required for bible | 11970645000 nm² |
| | 11971 µm² |
| | 0.012 mm² |
| | 1.2E−08 m² |
| | 1.86E−05 in² |
| Memory required to store bible | 4788258 Bytes |
| | 38306064 Bits |
| Memory density expected | 2064512133202 Bits/in² |
| | 2.06 Tbits/in² |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "an acid" includes two or more different acids. As used herein, the term "include" and its grammatical variants are intended to be non-limiting, such that recitation of items in a list is not to the exclusion of other like items that can be substituted or added to the listed items.

It should be appreciated that the decision as to whether the various parts of the controller are implemented in hardware (e.g. as a hard-wired circuit and/or as a circuit configuration fabricated into an application-specific integrated circuit) and/or software (e.g. machine-readable code, such code being instructions executable by an array of logic elements such as a microprocessor or other digital signal processing unit), and as to whether the state register and task database are stored in the same or separate storage devices (e.g. one or more semiconductor or ferroelectric memory units or magnetic or phase-change media such as disks (floppy, hard, CD, DVD, ROM or RAM)), is a matter of convenience in a particular embodiment of the invention. Also, the operations of constructing possible sequences of tasks and then selecting a sequence may be conducted sequentially, that is a plurality of sequences are generated and then searched for one meeting the relevant criteria, or in parallel, e.g. each sequence generated is tested against the relevant criteria as it is generated. In the latter approach, the generation of possible sequences may be halted as soon as a match is found or continued, if there is still the possibility of generating other possible sequences, to find multiple solutions which may then be selected from.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method of writing data to a data storage device comprising:
   acquiring data from a data source;
   encoding the data in a format for writing; and
   embedding the encoded data into one or more periodic structures formed by controlled chatter patterning onto a substrate of the data storage device.

2. The method according to claim 1, wherein the substrate includes a polymer material or a metal material.

3. The method according to claim 2, wherein the metal material is selected from the group consisting of gold, silver, copper, zinc, nickel, aluminum, tin, palladium, platinum and combinations and alloys thereof.

4. The method according to claim 2, wherein the polymer material is selected from the group consisting of polyacrylates, polystyrenes, polyesters, polycarbonates, polyolefins, polyurethanes, epoxies and combinations thereof.

5. The method according to claim 1, wherein the one or more periodic structures are of a scale between nanometers and micrometers.

6. The method according to claim 1, wherein the one or more periodic structures are arranged to store digital or analog data.

7. The method according to claim 1, wherein the one or more periodic structures includes a series of peaks and troughs formed into the substrate.

8. The method according to claim 1, wherein at least one of the one or more periodic structures differ in at least one parameter.

9. The method according to claim 8, wherein the at least one parameter is selected from the group consisting of spacing between an adjacent peak or trough, wavelength of the periodic structures, amplitude of the periodic structures and combinations thereof.

10. The method according to claim 1, further comprising selectively applying a cutting tool to the substrate by a controller that oscillates the cutting tool at a predetermined vibrational frequency.

11. The method according to claim 10, further comprising controlling a speed at which the cutting tool is applied to the substrate.

12. The method according to claim 10, wherein the cutting tool includes material selected from the group consisting of tungsten carbide, hardened steel, steel, brass, quartz, topaz, corundum, diamond and alloys and combination thereof.

13. The method according to claim 10, further comprising controlling a vibrational frequency with which the cutting tool is oscillated.

14. The method according to claim 10, further comprising controlling a speed at which the cutting tool is applied to across a surface of the substrate.

15. The method according to claim 10, further comprising controlling a speed at which the substrate is moved with respect to the cutting tool.

16. A method of reading data from a data storage device comprising:
   Imaging one or more periodic structures formed on a substrate of the data storage device by controlled chatter patterning; and
   converting the one or more periodic structures into user recognizable data using a predetermining coding algorithm.

17. The method according to claim 16, wherein the substrate includes a metal material selected from the group consisting of gold, silver, copper, zinc, nickel, aluminum, tin, palladium, platinum and combinations and alloys thereof or a polymer material selected from the group consisting of polyacrylates, polystyrenes, polyesters, polycarbonates, polyolefins, polyurethanes, epoxies and combinations thereof.

18. The method according to claim 16, wherein the one or more periodic structures are of a scale between nanometers and micrometers.

19. The method according to claim 16, wherein the controlled chatter patterning includes selectively applying a cutting tool to the substrate by a controller that oscillates a cutting tool at a predetermined vibrational frequency.

20. The method according to claim 16, wherein the imaging including providing a atomic force microscopy device or a transmission electron microscopy device to image the one or more periodic structures on the substrate.

21. A device for writing data to a data storage device comprising:
   a data acquisition module configured to acquire data to be written to the data storage device from a data source;
   an encoder configured to encode the data in a format for writing; and
   an embedder configured to embed the encoded data into one or more periodic structures formed by controlled chatter patterning onto a substrate of the data storage device.

22. A data storage device comprising:

a substrate including a one or more periodic structures formed thereon by controlled chatter patterning, wherein the one or more periodic structures are encoded to represent data stored thereon.

23. A device for reading data from a data storage device comprising:

an Imaging module configured to image one or more periodic structures formed on a substrate of the data storage device by controlled chatter patterning; and a conversion module configured to convert the one or more periodic structures into user recognizable data using a predetermining coding algorithm.

* * * * *